United States Patent [19]
Hoshino et al.

[11] Patent Number: 5,210,735
[45] Date of Patent: May 11, 1993

[54] OPTICAL RECORDING/REPRODUCING SYSTEM, HAVING FUNCTION OF DETECTING DIRT DEPOSITION ON OPTICAL PICKUP

[75] Inventors: Takashi Hoshino, Yokohama; Takashi Takeuchi, Fujisawa, both of Japan

[73] Assignee: Hitachi, Ltd., Tokyo, Japan

[21] Appl. No.: 542,824

[22] Filed: Jun. 25, 1990

[30] Foreign Application Priority Data

Jun. 23, 1989 [JP] Japan .................................. 1-161735

[51] Int. Cl.⁵ .......................... G11B 7/00; G11B 20/10
[52] U.S. Cl. .................................. 369/54; 369/44.25; 369/44.32; 250/572
[58] Field of Search ..................... 369/54, 44.25, 44.32, 369/44.33, 71; 250/201.5, 572; 356/237

[56] References Cited

U.S. PATENT DOCUMENTS

| | | | |
|---|---|---|---|
| 4,330,881 | 5/1982 | Nosker | 369/71 |
| 4,750,163 | 6/1988 | Yamamiya et al. | 369/54 |
| 4,924,406 | 5/1990 | Bergamini et al. | 250/572 |
| 4,969,139 | 11/1990 | Azumatani et al. | 369/54 |

Primary Examiner—Roy N. Envall, Jr.
Assistant Examiner—Jennifer L. Hazard
Attorney, Agent, or Firm—Antonelli, Terry, Stout & Kraus

[57] ABSTRACT

An optical recording/reproducing system comprising an optical pickup for recording and/or reproducing of data with respect to an optical recording medium. A reflection factor and a signal amplitude are obtained from the optical recording medium to be driven by the the recording/reproducing system. A reference level for detection of dirt deposition on the optical pickup is obtained on the basis of the reflection factor and signal amplitude information. The reference level for the dirt deposition is compared with a reproduction signal level obtained from the optical recording medium. A determination as to whether dirt is deposited or not is made on the basis of the comparison results.

22 Claims, 8 Drawing Sheets

OPTICAL RECORDING/REPRODUCING SYSTEM, HAVING FUNCTION OF DETECTING DIRT DEPOSITION ON OPTICAL PICKUP

This invention generally relates to an optical recording/reproducing system for an optical recording medium, and ore particularly to an optical recording/reproducing system which is capable of detecting dirt-deposited on or a dirtied condition of an optical pickup of the optical recording/reproducing system.

An optical recording/reproducing system has an advantage of being capable of recording/reproducing a huge amount of information onto/from an optical recording medium such as an optical disk, with a high density. The system has another advantage that it permits easy exchange of recording media.

The optical recording/reproducing system, on the other hand, involves rather delicate problems: an optical pickup, with is used for irradiating laser beams onto the recording medium and detecting reflected beams therefrom to perform recording/reproducing information, is not sealed; and this permits deposition of dirt or dust on an objective lens of the pickup; the dirt or dust deposition tends to obstruct passages of irradiated laser beams and reflected beams, thereby possibly resulting in an incorrect recording or reproducing. In addition to this, there is another problem that users can not know causes of the abnormal conditions which occur such as incorrect recording or reproducing. In fact, it takes considerable time and effort until the users finally see what is the real cause of the abnormal condition and remove the cause by cleaning the objective lens.

Some measures for resolving such problems have been proposed. Among these measures, there is a system as disclosed in Japanese Patent Application Laid-open Publication No. 60-74130. The optical disk recording/reproducing system disclosed in the publication has a cover on a laser beam emitting portion of an optical head. The cover is provided with means for measuring a laser beam output, which is located at a position opposite to the laser beam emitting portion. In this system, the cover prevents dust or dirt from being deposited onto the laser beam emitting portion. The deposition of dust or dirt is detected by the laser beam output measuring means and a user is informed that the or she should take necessary measures or clean the optical head. The laser beam output measuring means may comprise a photodetector. The publication also discloses as an alternative that a reflector may be provided on the cover to reflect the laser beam and a photodetector in the optical head may be used to measure the reflected laser beam.

This conventional system, however, has some disadvantages: a special optical detector or reflector dedicated for detecting deposition of dirt or dust is required; and it is necessary to move the optical head to a position for detection. More particularly, this makes it necessary to provide a space outside the optical disk for allowing movement of the optical head through some distance. This imposes a large restriction on the designing of the system, making the task of reducing the entire size of the system more difficult. Furthermore, there is an additional possibility that the detector or reflector may be dirtied and must be cleaned when dirtied. This renders the maintenance of the system more cumbersome.

SUMMARY OF THE INVENTION

It is therefore an object of the present invention to provide an optical recording/reproducing system which is capable of detecting deposition of dirt or dust on an optical pickup without providing any additional detecting means.

According to the present invention, a reference level indication of a degree of dirt deposition of an optical pickup is obtained, on the basis of a reflection factor and a signal amplitude which are given in association with an optical recording medium, and a level of a reproduction signal is compared with the so obtained reference level to output a signal which is indicative of whether the dirt deposition of the pickup exceeds the preset reference level or not. More particularly, the reflection factor and signal amplitude inherent in the respective optical recording medium are used to obtain a reference signal reproduction level for a reference dirt deposition degree. When reproduction level is lowered to below the reference signal reproduction level, dirt deposition on the optical pickup is detected.

A first aspect of the present invention features an optical recording/reproducing system for recording/reproducing data onto/from an optical recording medium, which comprises an optical pickup; means for recording/reproducing data with respect to the recording medium by the optical pickup; driving means for moving the optical pickup relative to the optical recording medium; operation means for computing a reference level of dirt deposition on the optical pickup, on the basis of the reflection factor and signal amplitude derives from the optical recording medium; and comparing means for comparing the so computed reference level by the operation means with a level of a reproduction signal from the optical recording medium to output a signal which is indicative of whether the dirt deposition on the optical pickup exceeds the reference level or not.

The comparing means may preferably have a function making a determination as to whether the dirt deposition on the optical pickup exceeds the reference level or not, based on the comparison result, and for outputting a determination result.

The operation means of the present invention may calculate a plurality of reference levels of the dirt deposition on the optical pickup, based on the refection factor and signal amplitude obtained from the optical recording medium. In this case, the comparing means compares the level of the reproduction signal from the optical recording medium with the plurality of reference levels calculated by the operation means.

The system may comprise a plurality of storing means for storing the comparison results outputted from the comparing means at different timings and determining means for determining whether the dirt of the optical pickup exceeds the reference levels on the basis of a plurality of results of comparison stored in the storing means and outputting results of determination. The system of the present invention may preferably comprise display means for indicating that deposition of dirt on the optical pickup has been up to a substantial level, when it is determined that the dirt of the optical pickup exceeds the reference level.

Furthermore or alternatively, the system of this invention may preferably comprise means for posting to a host computer, to which the optical recording/reproducing system is connected, that dirt is deposited on the optical pickup, when it is determined that the dirt of the optical pickup exceeds the reference level, so that a message indicative of that effect may be shown on displaying means of the host computer.

The optical recording/reproducing system according to this invention may constitute an information processing system in cooperation with the host computer connected thereto. The system according to this invention ay also be applied either to a system for recording only, or to a system for reproducing only.

In the system of this invention, the operation means calculates a reference signal level for detection of a reference dirt condition, on the basis of reflection factor information and signal amplitude information which are read from or given in connection with the optical recording medium, together with a preset laser beam output level for reproduction and a preset amplification factor of a preamplifier of the system. The comparing means compares the actually reproduced signal level with the calculated reference level and then outputs the result of comparison. The result of comparison may indicate the dirt deposition condition on the optical pickup. Therefore the user can know if there is a need for cleaning the optical pickup, before the dirt condition of the optical pickup becomes fatal or has reached to such a stage that the data recording/reproducing cannot be performed properly.

This invention eliminates both a cover and an additional means dedicated for measuring the laser beam output, which would require additional provision of special mechanisms or elements to the optical pickup and increase the total weight of the pickup. Moreover, the system of the present invention is advantageous in maintenance because it contains no excessive mechanisms or elements to be cleaned.

BRIEF DESCRIPTION OF THE DRAWINGS

This invention will now be described in further detail with reference to preferred embodiments as illustrated in the accompanying drawings, in which.

DESCRIPTION OF THE PREFERRED EMBODIMENTS

Preferred forms of optical recording/reproducing systems for recording and/or reproducing data into and/or from an optical recording medium such as an optical disk will now be described. Although the description of the embodiments will be made, while focusing on a dirt detection operation or function, which is a characteristic feature of this invention, the optical recording/reproducing system further comprises other components necessary for recording/reproducing data. In the system, the components used for recording/reproducing data may also be used, in common, for detection of dirt on the optical pickup.

Although detection of dirt on an objective lens of the optical pickup will be exemplarily described, the invention may not be limited thereto.

Figure 1:
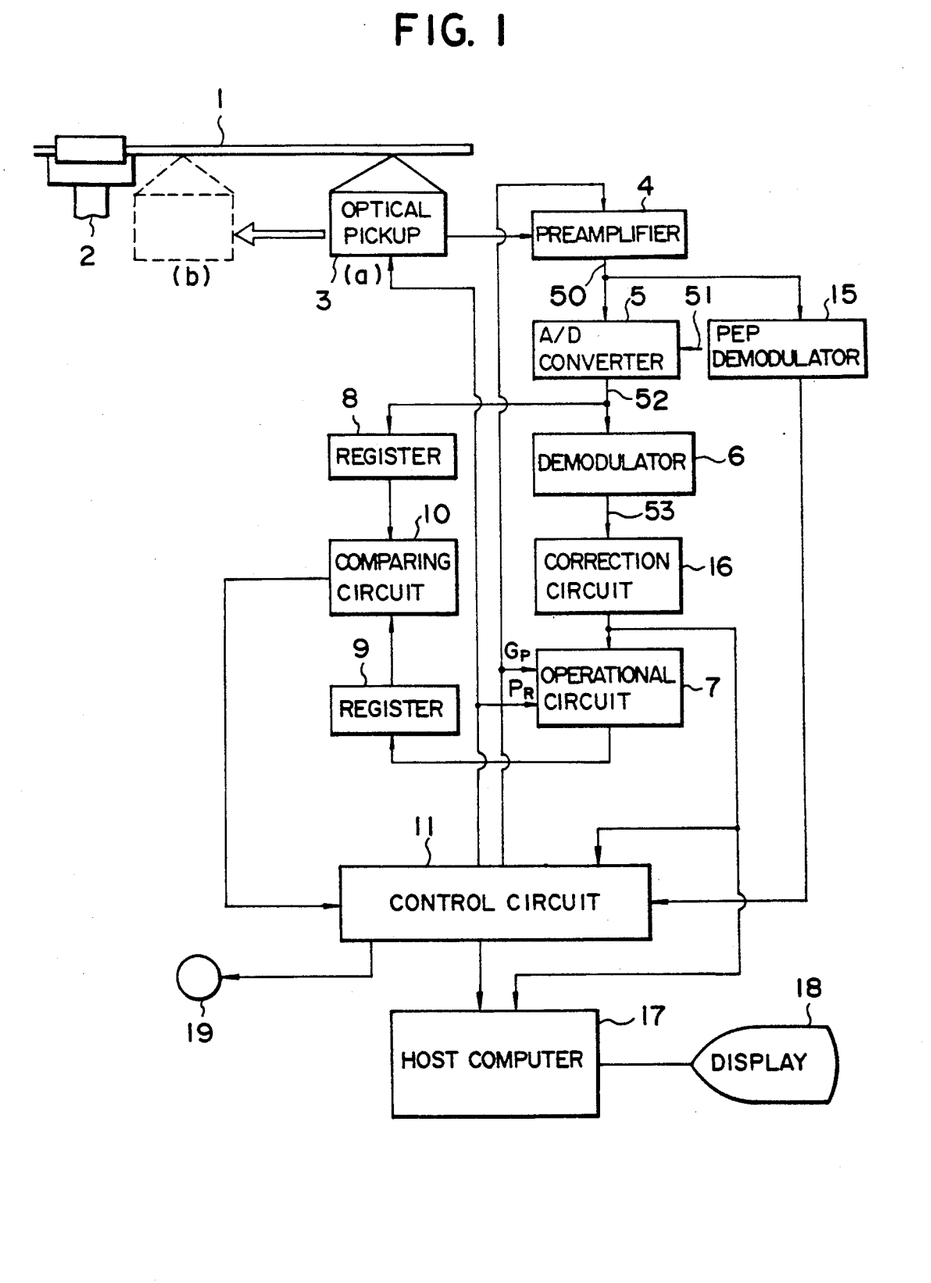
FIG. 1 is a block diagram showing a first form of an optical recording/reproducing system according to the invention.

An optical recording/reproducing system (hereinafter referred to also as a driving system) as illustrated in FIG. 1 comprises a driving section including a spindle motor 2 for rotationally driving an optical disk 1 and an optical pickup 3 for reading/writing data form/into the optical disk 1. The system further comprises a section functioning as a data reproducing system, a section functioning as a data recording system and a section functioning as a dirt detecting system.

The spindle motor 2 is controlled by a servo mechanism (not shown) to rotate the optical disk 1 at a high speed. The optical pickup 3 performs a seeking operation through a driving mechanism (not shown). The optical pickup 3 irradiates a laser beam onto the optical disk 1 and receives a beam reflected from the disk 1 to convert the same into an electric signal which is outputted as a reproduced signal.

The optical recording/reproducing system includes, as the section for the data reproducing system, a preamplifier 4 for amplifying the reproduced signal outputted from the optical pickup 3 to a level suitable for signal processing in a succeeding stage, an A/D converter 5 for converting the amplified reproduction signal 50 into a digital signal, a demodulator 6 for demodulating the digitized reproduction signal, a correction circuit 16 for correcting the demodulated data, and a PEP demodulator 15 for demodulating a PEP track signal as will be described later.

Figure 2:
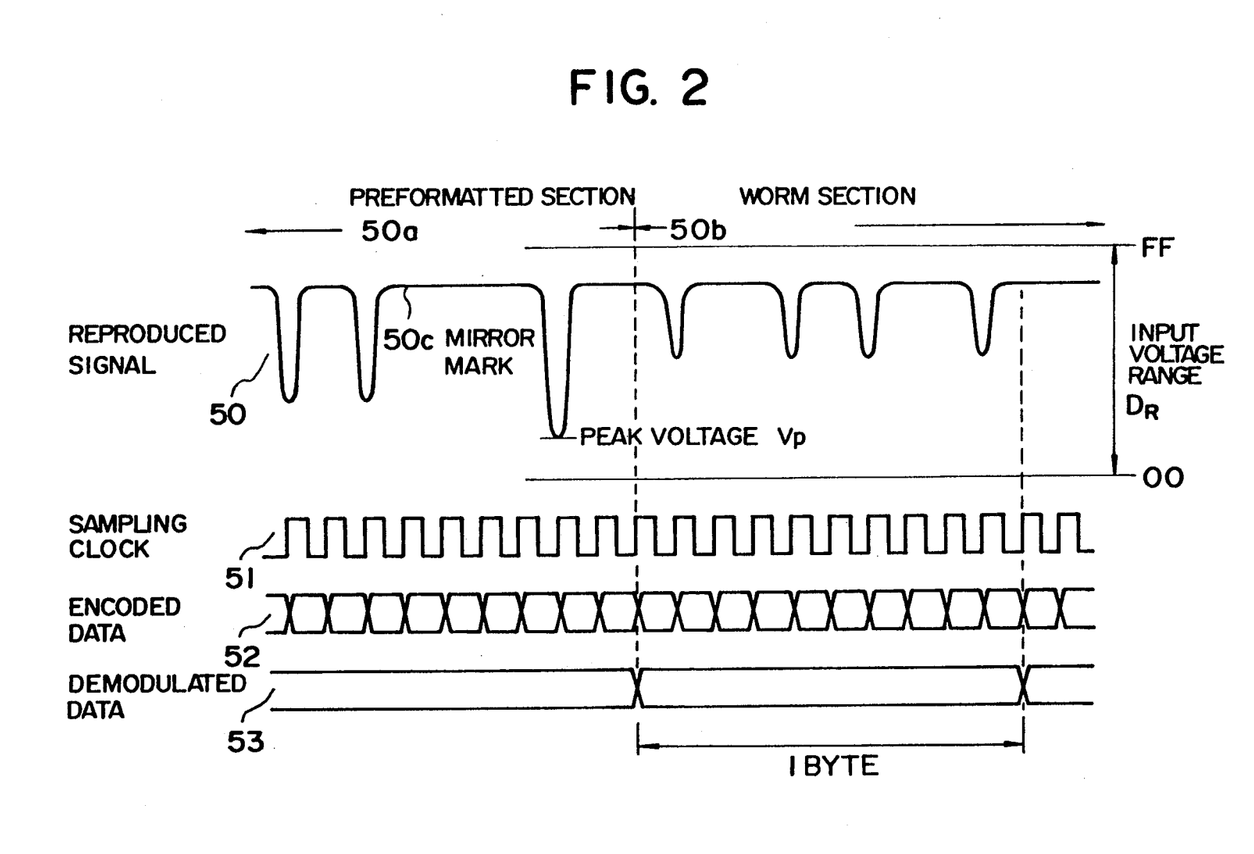
FIG. 2 is a diagram showing signal waves.

The A/D converter 5 digitizes and encodes the amplified reproduced signal 50 by using a sampling clock 51 as shown in FIG. 2. Then, if the A/D converter 5 is for 8 bit code length, encoded data 52 can be obtained in 256 steps of 00 to FF (hexadecimal notation). Therefore, in this embodiment, an amplification factor of the preamplifier 4 and an output level of laser beams irradiated from the optical pickup 3 for reproducing are set so that the level of all of the reproduced signal may be within the range. The demodulator 6 demodulates the data encoded by the A/D converter 5 and outputs demodulated data 53 of one byte every time an entire encoded data 5 of one byte is inputted. Normally, this demodulated data 53 is transferred to a host computer 17 via a correction circuit 16.

The section functioning as the data recording system (not shown), may be so constituted that data outputted from the host computer 17 may be added with parity data by a correction code producing circuit (not shown) and then the data may be written into the optical disk 1 by the optical pickup 3 after it has been modulated by a modulating circuit (not shown).

The section functioning as the dirt detecting system of this embodiment comprises an operational circuit 7 for calculating a reference level indicative of a degree of dirt on, at least, the objective lens of the optical pickup, on the basis of reflection factor information and signal amplitude information which have been read out from the optical disk 1 a register 9 for holding the calculated reference level from the operational circuit 7, a register 8 for holding a peak reproduced signal level from a preformatted section of the optical disk 1, a comparator circuit 10 for comparing the contents of the register 8 and 9, and a control circuit 11 functioning as means for determining whether or not the dirt of the optical pickup 3 exceeds the reference level to output the result of determination. The operational circuit 7 may, for example, comprise a microprocessor. This microprocessor is not limited to one which is dedicated to the arithmetic operation, and it may be commonly used for other control operations. The result of arithmetic operation is set in the register 9. The registers 8 and 9 and the comparing circuit 10 function as comparing means for comparing the reference level calculated by the operational circuit 7 with the peak reproduced signal level from the preformatted section of the optical disk 1 to output a signal indicative of which level is higher, or, whether or not the dirt of the optical pickup 3 exceeds the reference level. The control circuit 11 has a function of controlling the operation of the driving system, a function of transferring data between the driving system and the host computer 17, etc., in addition to the function as the determining means as mentioned above. This control circuit 11 may comprise a microcomputer. More specifically, this control circuit 11 may comprise a central processing unit (CPU) for performing an arithmetic operation, determination, control, etc., a read only memory (ROM) for storing programs for operations of CPU, a random access memory (RAM) which functions as a working area for CPU, etc., (not shown). Furthermore, the control circuit 11 has an indication device 19 for indicating the condition of dirt on the optical pickup 3. For example, the indication device 19 may be attached on the front panel of the driving system. The indication device 19, however, is not requisite to the present system and may be omitted.

The optical recording/reproducing system according to this embodiment is connected to the host computer 17 to constitute an information processing system. A display unit 18 having a cathode ray tube (CRT) or the like is connected to the host computer 17.

The optical disks or optical memory disks, which may be suitably used for the present invention, include a write-once-read-many (WORM) type, rewritable type, read-only type, etc. The optical disk of WORM type is preferably employed in the present embodiment. The embodiment may, however, be applicable to other types of optical disks, too.

In the WORM type optical disk, a preformatted section, which has been provided during the manufacturing of the disk, and a WORM section, which allows the user to write data therein, are arranged alternatingly. As can be seen form FIG. 2, a reproduced signal 50 has signal levels different from those of the preformatted sections 50a. The difference in signal levels depends upon a WORM mechanism employed, and the amplitude of the WORM sections 50b is lower as shown in FIG. 2, when the employed disk is a phase-change memory. Moreover, a reflection factor of a mirror mark or a baseline 50c where no recording has been made, and a factor indicative of a signal amplitude also depend on the make of the disk. According to a standard for a 130 mm optical disk of ISO (International Standard Organization), the baseline reflectivity R and the signal amplitude m is preformatted in a phase encoded part (PEP) and a standard format part (SFP), which are control track regions provided at an inner periphery of the disk, together with other disk information. The driving system can effect an appropriate level setting by reading out the values written in the regions.

An operation of this embodiment will now be described.

First, an optical disk 1 is set and starts to be rotated by the spindle motor 2. When the rotational speed of the optical disk 1 reaches a predetermined value, the optical pickup 3 is moved to a position (b) for reproducing data on a control track area (see FIG. 1). The optical pickup 3 first reproduces the PEP track data. Since the PEP track employs a special modulating system and recording bit rate, which are different from those of a track for normal recording and reproducing, the PEP track cannot be demodulated by the demodulator 6, but must be demodulated by the PEP demodulator 15 to provide disk information, such as reflection factor, etc. The obtained disk information is inputted to the control circuit 11, and then an optimum reproducing laser ray power $P_R$ and a preamplification factor $GP_P$ are set, on the basis of the disk information. Then, the optical pickup 3 reproduces the SFP track. Since the SFP track is in the same recording system as the track for the normal recording and reproducing, it can be demodulated by the A/D converter 5 and the demodulator 6. The SFP track contains various disk information in addition to the information provided by the PEP track. This information is information used in the control circuit 11 to control the driving system. On the other hand, the reflection factor information and signal amplitude information obtainable from the SFP track are inputted to the operational circuit 7. The information indicative of the amplification factor $G_P$ of the preamplifier 4 and information indicative of the reproducing laser ray power $P_R$ are inputted to the operational circuit 7. The operational circuit 7 calculates a reference level for detection of dirt deposition, which is to be stored in the register 9. A baseline voltage $V_G$ for the mirror mark and a peak voltage $V_P$ from the preformatted section of the optical disk being subjected to the recording/reproducing are calculated according to the following equations:

$$V_{GR} = R_P \times P_R \times G_{PR} \tag{1}$$

$$V_{PR} = V_{GR}(1 - m_R) \tag{2}$$

$$V_G = (R/R_R) \times (P_R/P_{RR}) \times (G_P/G_{PR}) \times V_{GR} \tag{3}$$

$$V_P = (V_G(1-m)/V_{GR}(1-m_R)) \times V_{PR} \tag{4}$$

where $R_R$ is a reference disk reflection factor, $m_R$ is a reference disk signal amplitude, $G_{PR}$ is a reference preamplification factor, $P_{RR}$ is a reference reproducing laser beam output level, $V_{GR}$ is a baseline voltage inputted to the A/D converter 5 and $V_{PR}$ is a peak voltage from the preformatted section, which are set in the driving system.

If the encoded data of $V_{PR}$ is "00" and the range of the input voltage to the A/D converter 5 is $D_R$, the encoded data of $V_P$ $_{PI}$ is $(V_P - V_{PR})/(D_R/256)$. More particularly, under a normal condition, the peak voltage from the preformatted section is around $V_P$ within a range of minute variation so the disk reflection factor, the disk signal amplitude, the reproducing laser beam output level and the preamplification factor. If dirt such as dust or the like is deposited on the objective lens of the optical pickup 3, the level of reproduced signal is significantly lowered out of the normal minute variation range, because both the irradiated laser beams and the reflected beams from the disc are subjected to attenuation.

Therefore, if the encoded data of the peak voltage which drops out of the normal minute variation range is set as the reference level in the register 9, it is detected that the reproduced signal becomes lower than the reference level, by holding the encoded data of the peak voltage from the preformatted section during the reproduction and comparing the data in the register 9 in the comparing circuit 10. More specifically, under the conditions that the polarity of the signal and the direction of encoding are as shown in FIG. 2, if register 9 is greater than that of register 8, the comparing circuit 10 outputs a signal level of "L". If register 9 is less than that of register 8, the comparing circuit 10 outputs the signal level of "H". Incidentally, if either one of the polarity of the signal and the direction of encoding as shown in FIG. 2 is reversed, it is apparent that the comparison results will be reversed. Signals indicative of the comparison results of the comparing circuit 10 are inputted to the control circuit 11. The control circuit 11 makes a determination of "normal" if the signal is of "L" level and makes a determination of "abnormal" if the signal is of "H" level. The so obtained signal indicative of an abnormal condition is sent to the host computer 17 through the control circuit 11 to display a message "cleaning of objective lens is needed" on the display unit 18 of the host computer 17 to call user's attention. Alternatively, such a message can be displayed by lighting the indication device 19 on the front panel of the driving system.

With this arrangement, an abnormal condition due to dirt deposition on the objective lens can be detected accurately, thereby to prevent possible troubles which might otherwise be caused if the recording/reproducing is carried out under the abnormal conditions.

Figure 3:
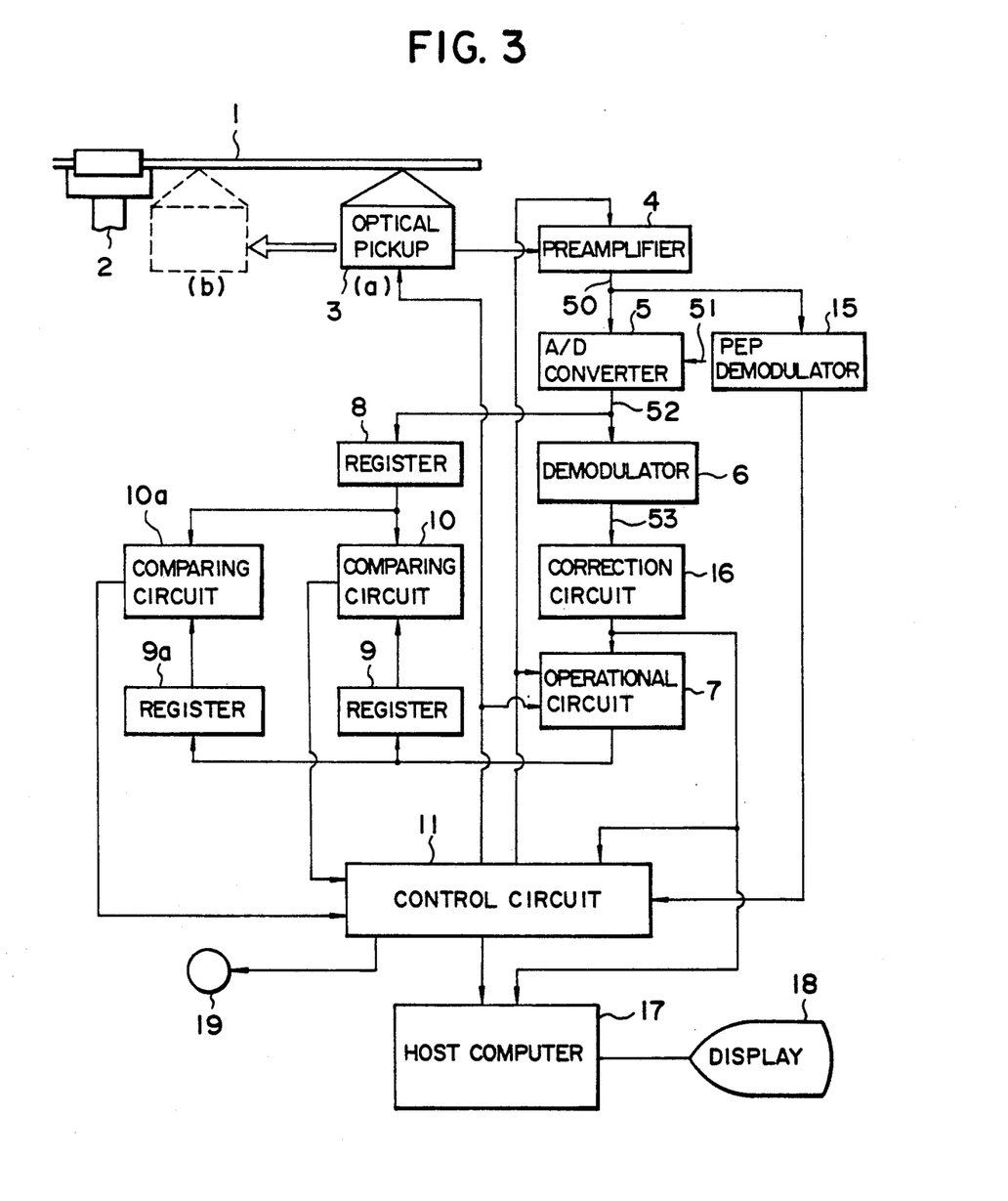
FIG. 3 is a block diagram showing a second form of an optical recording/reproducing system according to the invention.

A second embodiment of the invention will be described with reference to FIG. 3. In FIG. 3, the same or similar parts or portions as or to those of the embodiment of FIG. 1 are denoted by the same or similar reference umbers and are not described here. In FIG. 3, 9a designates a second reference level register for storing second reference level as calculated in the operation al circuit 7, 10a designates a second comparing circuit for comparing the value of the second reference level register with the value of the register 8 which stores an encoded data of the peak value from the preformatted section of the reproduced signal. In the second embodiment, the comparing means comprises the comparing circuits 10 and 10a and the registers 8, 9 and 9a.

An operation of the driving system is as follows: an optical disk 1 is set and then rotated by the spindle motor 2 at a predetermined rotational speed; the optical pickup 3 is moved to the position (b) so as to reproduce PEP and SFP informations; an optimum amplification factor for the preamplifier 4 and an optimum output level of reproducing laser beam are set according to the so reproduced informations; the operational circuit 7 calculates a reference level for detection of dirt deposition on the objective lens, based on the reflection factor information obtained form the optical disk 1 as well as information as to the set amplification factor and laser beam output information; and the so calculated reference level is outputted to the register 9 as in the first embodiment. The operational circuit 7 further calculates an intermediate value between the limits of a minute variation range in a normal operation when there is no substantial dirt deposition on the objective lens and the reference value for detection of an abnormal condition stored in the register 9. The so obtained intermediate value is stored in the register 9a as a second reference level. If the polarity of a reproduction signal and the direction of encoding are as shown in FIG. 2, the second comparing circuit 10a outputs a signal of "L" when register 9a is less than that of register 8 and a signal of "H" when register 9a is greater than that of register 8.

The control circuit 11 makes a determination as to the condition of the driving system on the basis of two comparison results obtained from the comparing circuits 10 and 10a. More particularly, when both of the two signals are "L", it indicates that the driving system is under a normal condition; when both of the two signals are "H", it indicates that dirt is deposited on the objective lens which would require cleaning of the lens; and when only the result of comparison from the comparing circuit 10a is "H", it indicates that dirt is being deposited onto the objective lens, but the dirt deposition has not yet reached an abnormal condition. The control circuit 11 may notify the host computer 17 of the results to display a message "dirt is being deposited" on the display unit 18 or notify the user of the condition of dirt deposition on the objective lens by means of the indication device 19 attached on the front panel of the driving system. Thus, the reference levels are provided for different dirt deposition stages, respectively, so that it is possible to clean the objective lens before the driving system has gotten into an inoperative or unusable condition.

Although two reference levels are provided in the second embodiment, more than two reference levels may be provided. In this case, since conditions between normal and abnormal stages can be determined more strictly, the user can know the condition of dirt deposition more accurately.

Figure 4:
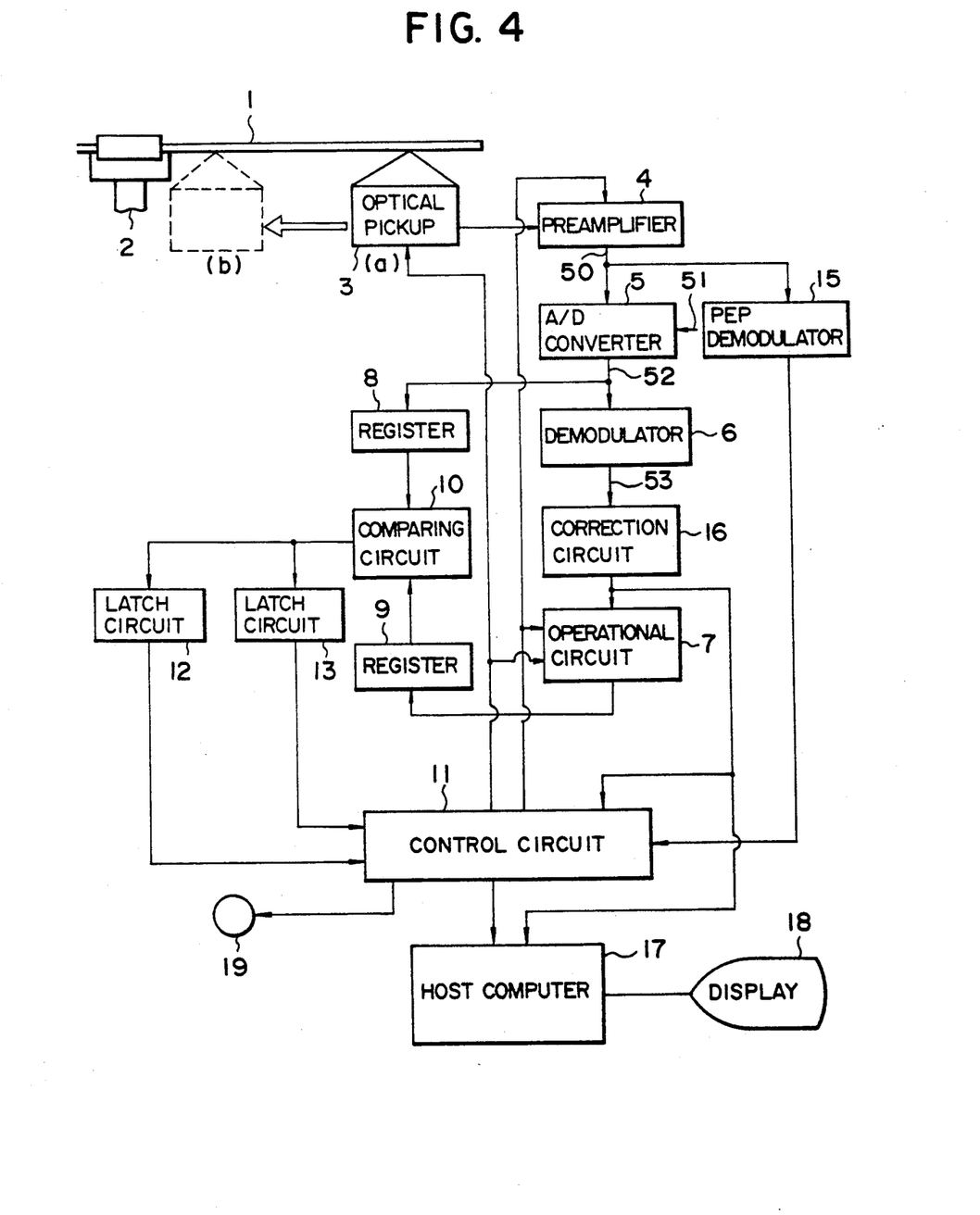
FIG. 4 is a block diagram showing a third form of an optical recording/reproducing system according to the invention.

A third embodiment of the invention will be described, referring to FIG. 4. In FIG. 4, same or similar parts or portions as or to those of the embodiment of FIG. 1 are denoted by the same or similar reference, numerals and the description thereof is omitted here. In FIG. 4, reference numerals 12 and 13 indicate latch circuits for storing the results of comparison by the comparing circuit 10. The two latch circuits operate to store the results of comparison by the comparing circuit 10 at different timings. The control circuit 11 determines that dirt is deposited on the objective lens in the driving system when both of the two latch outputs show abnormal conditions. On the other hand, if only one latch output shows an abnormal condition it is determined that the detection of abnormal signal level is due to a defect in the optical disc or dirt deposition on the surface of the disk, thereby preventing a message "dirt being deposited on the objective lens" from being displayed and preventing the related operations from being carried out.

The latching timings may be selected when the objects to be accessed by the optical pickup are changed: (1) when different positions on the same track of the optical disk are accessed, (2) the tracks to be accessed are changed, and (3) optical disks are replaced. The number of latch circuits or latch timings may be increased to make a determination on the basis of increased number of comparison results. The three latch timings as mentioned above may be employed in combination to know the situation more accurately.

With this arrangement of the third embodiment, the abnormal condition due to the dirt deposition on the objective lens can be distinguished from the abnormality due to the other causes such as a defect of the optical disk or dirt deposition on the optical disk. Thus, erroneous detection leading to erroneous display of dirt deposition on the optical lens can be prevented. Furthermore, the embodiment of FIG. 4 may be combined with the embodiment of FIG. 3, to attain more accurate and precise dirt detection and indication.

In this connection, it is to be noted that the operational circuit 7, the registers 8, 9 and 9a, the comparing circuits 10 and 10a and the latch circuits 12 and 13 as used in the embodiments may be realized by operational circuits, memories such as a RAM, or software. Especially, when the control circuit 11 is constituted by a computer, such as a microcomputer, the above-mentioned components can be included in the computer to obtain the same functional advantages as the embodiments described above.

Figure 5:
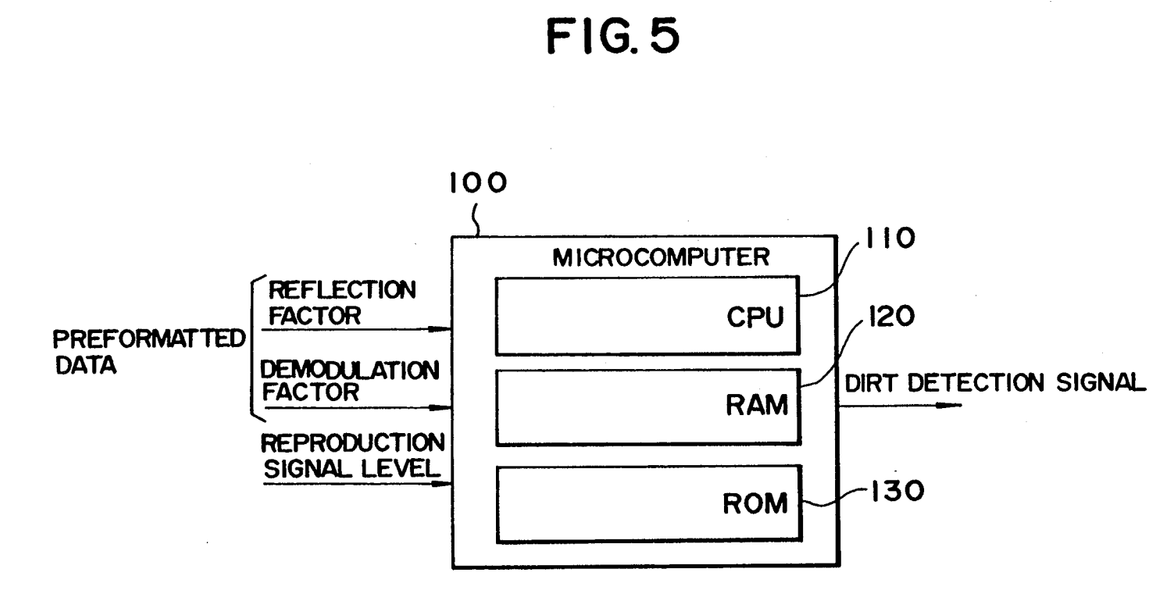
FIG. 5 is a block diagram showing a system wherein dirt detection is performed by use of a microcomputer according to the invention.
Figure 6:
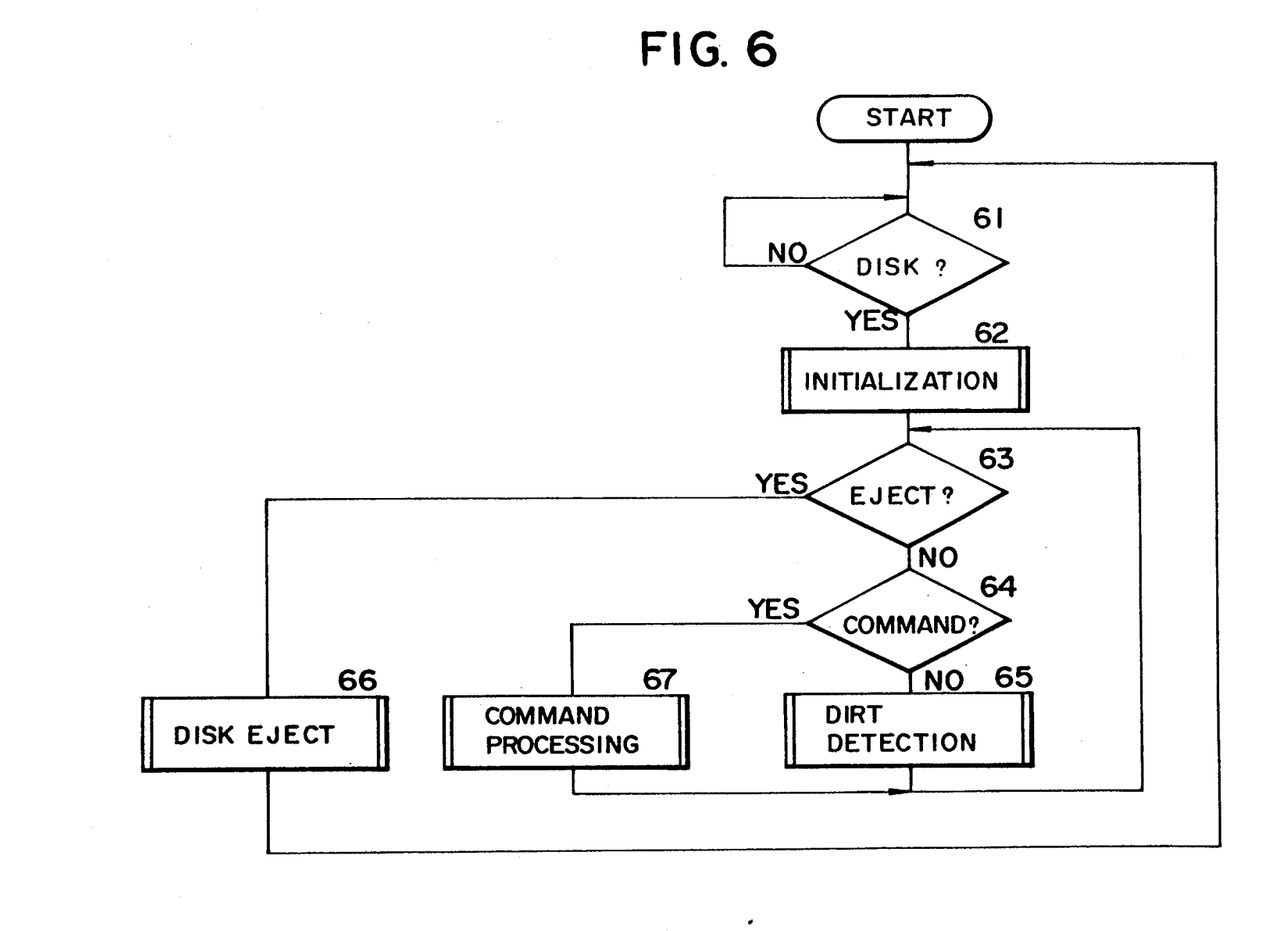
FIGS. 6, 7 and 8 are flow charts showing operation flows through which processing of a control circuit and detection of dirt are performed by using a microcomputer.
Figure 7:
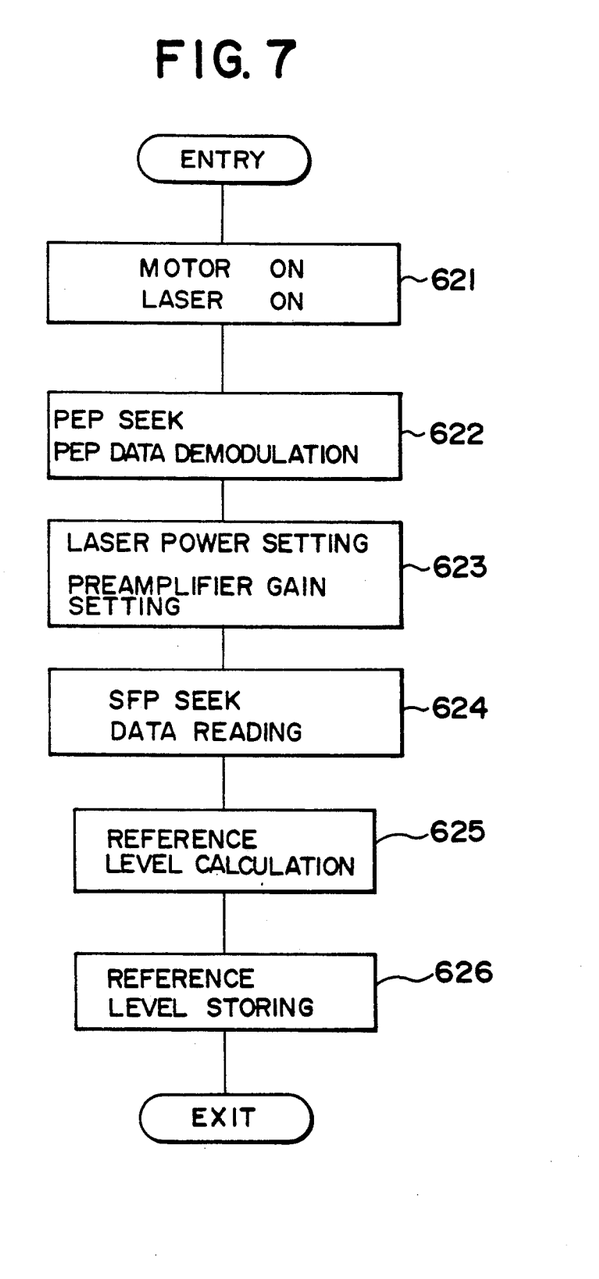
Figure 8:
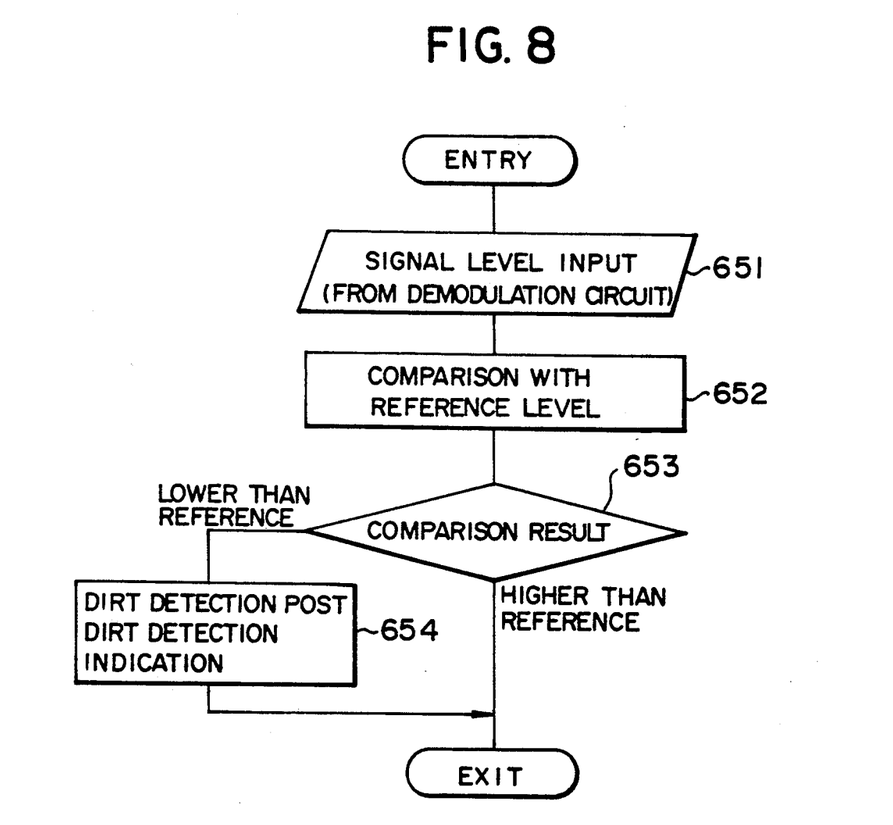

An embodiment in which dirt detection is carried out by means of a microcomputer will now be described. The calculation of the reference level or levels, comparison and notification of dirt deposition are carried out by the microcomputer comprising a central processing unit (CPU) 110, a data storing device (RAM) 120 and a program storing device (ROM) 130 as shown in FIG. 5. The microcomputer used as the control circuit in each embodiment shown in FIG. 1, 3 or 4 may also be used for this purpose as specified above. FIGS. 6 to 8 show flow charts of the detailed operations of the microcomputer which is used for attaining the dual functions.

First, the dirt detection by the microcomputer will be described, while referring to the flow charts and the figures referred to above. CPU 110 executes the operations of control, calculation, etc. According to the programs stored in ROM 130. When the loading of the optical disk 1 is detected, an initialization routine is executed (steps 61, 62). FIG. 7 shows the flow chart for the initialization routine. First, the spindle motor 2 is energized to rotate the optical disk 1, and a laser drive is energized (step 621). Then, the optical pickup 3 is moved (an seek operation) to PEP at the innermost periphery of the optical disk 1 to detect PEP data. The PEP data is demodulated by the PEP demodulator 15. Data including a type of the optical disk 1, a reproducing laser power, a reflection factor and a signal amplitude are obtained from the PEP data, to set a reading laser power and a preamplification gain (steps 622 and 623). Then the optical pickup 3 is moved to SFP to demodulate the SFP data (step 624). SFP contains recording conditional data in addition to data of the reproducing laser power, reflection factor and signal amplitude as in the PEP. The SFP data is read to set the recording conditions for the driving system. In this connection, since data of the reflection factor and the signal amplitude to be used for calculation of the reference level are obtainable from either PEP or SFP, the present embodiment can also be applied to a system wherein the PEP reading is not carried out. From the data of the reflection factor and the signal amplitude thus obtained, a peak level from the preformatted section 50a of the optical disk 1 being driven is calculated through an arithmetic operation according to the equations (3) and (4) as given before (step 625). A value of the peak level multiplied by a certain rate is stored, as a reference level for dirt detection, at a predetermined address of the RAM 130 (step 626). A plurality of such values may be employed instead of employing only one value. In this case, additional memory areas of RAM 130 are needed accordingly.

After completion of the initialization, the system is placed in the state of waiting for a command from the host computer until an eject operation is carried out (steps 63 and 64) as shown in the flowchart of FIG. 6. When the command is inputted, the system processes the command (step 67). When no command is inputted, dirt detection routine is executed (step 65).

FIG. 8 shows an example of the dirt detection routine. The peak signal level for the preformatted section 50a which has been subjected to A/D conversion is inputted and compared with the reference level set in the above mentioned initialization routine (steps 651 and 652). With respect to the wave shapes shown in FIG. 2, if dirt is deposited on the objective lens, the signal level is lowered. When the signal level becomes lower than the reference level, it is determined that dirt has been deposited on the objective lens, to notify or post it to the host computer or light the indication device for advising the user of the dirt deposition (step 654). On the other hand, if a preamplifier having a control loop to keep the baseline voltage $V_G$ at a constant value is used, the peak voltage $V_P$ is raised in voltage level of FIG. 2, due to the dirt deposition on the objective lens. In this case, therefore, dirt detection is made when the reproduction signal level becomes higher than the reference level. Furthermore, for a disk wherein the relationship between the baseline voltage $V_G$ and the peak voltage $V_P$ as shown in FIG. 2 is reversed, this embodiment can be applied by appropriately modifying the processing for the reference level or the comparison results. In the processing procedures, the sequence of the execution of the dirt detection routine is not limited to that shown in FIG. 6. The dirt detection routine may be executed just after the initialization routine. For example, the dirt detection routine may be executed only once after a disk has been set, or may be executed at constant time intervals set by a timer provided in the microcomputer.

Although each of the foregoing embodiments has been described in connection with the optical disk, this invention may be applied to any other optical recording medium having a similar preformat.

In the foregoing embodiment, the reflection factor information and the signal amplitude information are preliminarily given on the optical disk in the preformatted section. However, this invention is not limited to this way of giving the information. The information of the reflection factor and the signal amplitude may be given in another way. In this case, even an optical recording medium in which the reflection factor and signal amplitude information are not provided in the form of preformat could attain the dirt deposition on the optical pickup. For example, the reflection factor information and the signal amplitude information for the optical recording medium to be used may be preliminarily given by using storing means such as ROM. In this case, the operational means reads the reflection factor information and the signal amplitude information from the storing means for setting the reference level for the detection of dirt on the optical pickup. Alternatively, a reference level for the dirt detection of the optical pickup is preliminarily obtained for the optical recording medium to be driven. The obtained reference level is stored in the storing means and given therefrom. For example, the register 9 shown in FIG. 1 may be used as the storing means for this purpose. In this case, the register may be rewritten according to the type of the optical recording medium to be used. Instead of the register, a ROM may be employed for the same purpose. With this arrangement, the operational circuit may be omitted. However, when the operational circuit is employed, both preformatted and unpreformatted optical recording media may be used with the system of the present invention.

According to this invention, deposition of dust or dirt on the objective lens of an optical pickup in an optical disk driving system can be detected and displayed, so that it is possible to avoid an occurrence of an inoperative state of the driving system and to quickly recover the driving system from such an inoperative state, when it occurs.

It is further to be noted that the peak reproduction signal level is obtained from the preformatted section of the optical recording medium in the foregoing embodiment, but the present invention is not limited to this. For example, the peak reproduction signal level may alternatively be obtained from a data recording region. Further, although the dirt detection is made by using the peak reproduction signal level in the foregoing embodiments, the invention is not limited thereto. An average vale level of the reproduction signal levels may alternatively be used.

What is claimed is:

1. An optical recording/reproducing system for recording/reproducing data with respect to an optical recording medium, comprising:
   an optical pickup;
   means for recording/reproducing data with respect to the optical recording medium using the optical pickup;
   driving means for moving the optical recording medium relative to the optical pickup;
   operational means for computing a reference level for detection of dirt deposition on the optical pickup using reflection factor information and signal amplitude information provided in association with the optical recording medium; and
   comparing means for comparing the reference level computed by the operational means with a peak reproduction signal level obtained from the optical recording medium to output a signal indicative of whether the dirt on the optical pickup exceeds the reference level.

2. An optical recording/reproducing system for recording/reproducing data with respect to an optical recording medium including reflection factor information and signal amplitude information which are provided in a predetermined section on the optical reading medium, comprising:
   an optical pickup;
   means for recording/reproducing data with respect to the optical recording medium using the optical pickup;
   driving means for moving the optical recording medium relative to the optical pickup;
   means for reading the reflection factor information and the signal amplitude information from the preformatted section of the optical recording medium;
   operational means for computing a reference level for detection of dirt deposition on the optical pickup using reflection factor information and signal amplitude information which have been read from the optical recording medium;
   comparing means for comparing the reference level computed by the operational means with a reproduction signal level obtained from the optical recording medium; and
   determination means for determining whether the dirt deposition on the optical pickup exceeds the reference level or not on the basis of the comparison result.

3. An optical recording/reproducing system according to claim 2, wherein the operational means has a function of computing a plurality of reference levels for the dirt deposition on the optical pickup, and the comparing means has a function of comparing the reproduction signal level from the optical recording medium with said plurality of reference levels.

4. An optical recording/reproducing system according to claim 3, wherein said plurality of reference levels are provided according to the dirt deposition stages, respectively.

5. An optical recording/reproducing system according to claim 2, which further comprises a plurality of storage means for storing respective comparison results outputted from the comparing means at different timings; said determination means having a function of determining whether the dirt deposition on the optical pickup exceeds the reference level using the comparison results stored in said plurality of storage means.

6. An optical recording/reproducing system according to claim 5, wherein the storage means stores comparison results outputted from the comparing means at a timing when a position accessed by the optical pickup is changed.

7. An optical recording/reproducing system according to claim 6, wherein said timing is one of a timing when different positions of a same track on the optical recording medium are accessed, a timing when different tracks are accessed and a timing when the optical recording medium is replaced with another optical recording medium.

8. An optical recording/reproducing system according to claim 2, wherein the operational means has a function of computing a plurality of reference levels for detection of dirt deposition on the optical pickup; the comparing means has a function of comparing the reproduction signal level of the optical recording medium with said plurality of reference levels; which further comprises a plurality of storage means for storing the comparison result outputted from the comparing means at different timings; wherein the determination means has a function of determining whether the dirt deposition on the optical pickup exceeds the reference level or not, using the comparison results stored in the storage means.

9. An optical recording/reproducing system for recording/reproducing data with respect to an optical recording medium, comprising:
   an optical pickup;
   means for recording/reproducing data with respect to the optical recording medium by using the optical pickup;
   driving means for moving the optical recording medium relative to the optical pickup;
   means for reading reflection factor information and signal amplitude information from the optical recording medium;
   operational means for computing a reproduction signal level under a normal condition, which is determined by reflection factor information and signal amplitude information given in association with the optical recording medium to set a reference level for use in detection of dirt deposition according to the reproduction signal level;

means for storing a reference level for use in detection of dirt deposition on the optical pickup;

comparing means for comparing the reference level stored in the storage means with an actual reproduction signal level from the optical recording medium; and determination means for determining whether the dirt deposition on the optical pickup exceeds the reference level or not using the comparison result.

10. An optical recording/reproducing system according to claim 2, wherein:

the means for reading the reflection factor information and the demodulation factor information includes a preamplifier for amplifying a reproduction signal outputted from the optical pickup to a level suitable for a signal processing at a succeeding stage, and A/D converter for converting the so amplified reproduction signal into a digital signal, a demodulator for demodulating the digitized reproduction signal to demodulated data, and a correction circuit for effecting correction for the demodulated data; and the comparing means includes a first register for storing the reference level computed by the operational means, a second register for storing the reproduction signal from the optical recording medium which is outputted from the A/D converter, and a comparator circuit for comparing the contents of said first and second registers.

11. An optical recording/reproducing system according to claim 10, which further comprises a plurality of latch circuits for storing the comparison results outputted from the comparator circuit at different timings; and wherein the determination means has a function for determining whether the dirt deposition on the optical pickup exceeds the reference level or not using a combination of the comparison results stored in the latch circuits.

12. An optical recording/reproducing system according to claim 2, which further comprises indication means for indicating that dirt is being deposited on the objective lens of the optical pickup when the dirt deposition on the optical pickup is determined to exceeds the reference level.

13. An optical recording/reproducing system according to claim 5, which further comprises indication means for indicating that dirt is being deposited on the objective lens of the optical pickup when the dirt deposition on the optical pickup is determined to exceed the reference level.

14. An optical recording/reproducing system according to claim 8, which further comprises indication means for indicating that dirt is being deposited on the objective lens of the optical pickup when the dirt deposition on the optical pickup is determined to exceed the reference level.

15. An optical recording/reproducing system according to claim 2, which further comprises post means for posting information that dirt is being deposited on the optical pickup to a host computer which is connected to the recording/reproducing system when it is determined that the dirt deposition on the optical pickup exceeds the reference level.

16. An optical recording/reproducing system according to claim 15 wherein said host computer connected to the optical recording/reproducing system includes a display and means for displaying a message that dirt is being deposited on the optical pickup on the display.

17. An optical recording/reproducing system according to claim and further comprising:

a host computer connected to the optical recording/reproducing system;

the optical recording/reproducing system including post means for posting an information that dirt is being deposited on the optical pickup when it is determined that the dirt deposition on the optical pickup exceeds the reference level;

the host computer including a display and having a function for displaying the information that dirt is being deposited on the optical pickup on the display.

18. An optical recording/reproducing system according to claim 8, and further comprising a host computer connected to the optical recording/reproducing system;

the optical recording/reproducing system including post means for posting an information that dirt is being deposited on the optical pickup when the dirt deposition on the optical pickup exceeds the reference level;

the host computer including a display and having a function for displaying the information that dirt is being deposited on the optical pickup on the display.

19. An optical recording/reproducing system for recording/reproducing data with respect to an optical recording medium, comprising:

an optical pickup;

means for recording/reproducing data with respect to the optical recording medium by using the optical pickup;

drive means for moving the optical recording medium relative to the optical pickup;

means for storing a reference level for dirt deposition on the optical pickup, which is obtained using reflection factor information and signal amplitude information given in association with the optical recording medium; and comparing means for comparing the reference level stored in the storing means with a reproduction signal level from the optical recording medium to output a signal indicative of whether the dirt deposition on the optical pickup exceeds the reference level or not.

20. A dirt detection method for an optical pickup used in an optical recording/reproducing system, comprising the steps of:

computing a reference level for dirt deposition on the optical pickup using reflection factor information and signal amplitude information which are given in association with an optical recording medium for use with said optical recording/reproducing system; and comparing the computed reference level with a reproduction signal level obtained from the optical recording medium to output a signal indicative of whether or not the dirt deposition on the optical pickup exceeds the reference level.

21. A dirt detection method according to claim 20, wherein said reflection factor information and said signal amplitude information are preliminarily provided in a preformatted section on the optical recording medium and read therefrom.

22. An optical recording/reproducing system according to claim 10, wherein the means for reading the reflection factor information an the signal amplitude information further includes a PEP demodulator for demodulating data in a PEP from an output of the preamplifier so as to read out the reflection factor information and the signal amplitude information to be recorded in the PEP, said data in the PEP being preformatted by a demodulation method different from other tracks.

* * * * *